United States Patent
Wu et al.

(10) Patent No.: US 8,750,314 B2
(45) Date of Patent: Jun. 10, 2014

(54) METHOD AND DEVICE FOR LINK PROTECTION IN VIRTUAL PRIVATE LOCAL AREA NETWORK

(75) Inventors: Shihua Wu, Shenzhen (CN); Shimeng Chen, Shenzhen (CN); Guangping Niu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 137 days.

(21) Appl. No.: 13/510,257

(22) PCT Filed: Sep. 25, 2010

(86) PCT No.: PCT/CN2010/077286
§ 371 (c)(1),
(2), (4) Date: May 16, 2012

(87) PCT Pub. No.: WO2011/060667
PCT Pub. Date: May 26, 2011

(65) Prior Publication Data
US 2012/0239965 A1    Sep. 20, 2012

(30) Foreign Application Priority Data
Nov. 18, 2009  (CN) .......................... 2009 1 0223391

(51) Int. Cl.
*H04L 12/28*  (2006.01)

(52) U.S. Cl.
USPC ................................... 370/395.53

(58) Field of Classification Search
None
See application file for complete search history.

(56) References Cited

U.S. PATENT DOCUMENTS

| | | | |
|---|---|---|---|
| 2005/0097219 A1 | 5/2005 | Goguen et al. | |
| 2007/0253326 A1* | 11/2007 | Saha et al. | 370/217 |
| 2008/0159311 A1* | 7/2008 | Martinotti et al. | 370/401 |
| 2009/0109869 A1* | 4/2009 | Hsiao et al. | 370/254 |
| 2009/0201831 A1 | 8/2009 | Kumar et al. | |

FOREIGN PATENT DOCUMENTS

| | | |
|---|---|---|
| CN | 1863069 A | 11/2006 |
| CN | 101030917 A | 9/2007 |
| CN | 10134035 A | 1/2009 |
| CN | 101572666 A | 11/2009 |
| EP | 1853007 A1 | 11/2007 |

OTHER PUBLICATIONS

International Search Report for PCT/CN2010/077286.

* cited by examiner

*Primary Examiner* — Anh-Vu Ly
*Assistant Examiner* — Hashim Bhatti
(74) *Attorney, Agent, or Firm* — McClure, Qualey & Rodack, LLP

(57) ABSTRACT

The present invention discloses a method and device for a link protection in a virtual private local area network, which relates to the network data communication technology. The method of the present invention includes: in a networking process of a VPLS network, a link protection device establishing a main tunnel and a standby tunnel of MPLS TE for a link, and creating a VPLS forwarding table to deal with the information of the established MPLS TE main tunnel and standby tunnel; and when receiving a VPLS message, the link protection device searching the information of the MPLS TE main tunnel of the VPLS message according to a way of accessing the VPLS network of the VPLS message and the VPLS forwarding table, and if the found MPLS TE main tunnel is invalid, then transmitting the received VPLS message by adopting the standby tunnel of the MPLS TE main tunnel.

4 Claims, 2 Drawing Sheets

METHOD AND DEVICE FOR LINK PROTECTION IN VIRTUAL PRIVATE LOCAL AREA NETWORK

CROSS REFERENCE RELATED APPLICATIONS

This application is a national phase of PCT/CN2010/077286 filed Sep. 25, 2010, which claims priority to China Application Serial No. 200910223391.2, filed Nov. 18, 2009, both of which are entirely incorporated herein by reference.

TECHNICAL FIELD

The present invention relates to the network data communication technology, and in particular, to a method and device for link protection in a virtual private local area network.

BACKGROUND OF THE RELATED ART

The VPLS (Virtual Private LAN Services) is one kind of services providing the simulation LAN (Local Area Network) on a MPLS (Multi-protocol Label Switching) network, which can make users access the network from a plurality of points of dispersive geographic locations at the same time and access each other, just like these points directly accessing the LAN. The VPLS combines the advantages of Ethernet and MPLS technologies, which is a simulation of all features of the traditional LAN; and its main purpose is to connect a plurality of LANs formed from the Ethernets and isolated at the region through the MPLS network provided by the operator, so as to make them work as one LAN, thereby forming a virtual private network.

The traffic engineering can be implemented by using an overlapping model on IGP (internal gateway protocols), such as IP over ATM (Asynchronous Transfer Mode), IP over FR (Frame Relay), etc. The overlapping model provides a virtual topological structure above a physical topological structure of the network, thereby extending the space of network design and providing a lot of important functions for supporting traffic and resource control, which can support various traffic engineering policies.

The MPLS TE (MPLS Traffic Engineering) technology has combined the MPLS technology and traffic engineering, and has a lot of advantages: in the process of establishing a LSP (Label Switching Path) tunnel, resources can be preserved and the service quality is guaranteed; the LSP tunnel has various attributes, such as priority, seizing, etc., which can control behaviors of the LSP tunnel conveniently; through a backup path and fast reroute technology, the protection is provided in the case of the link/node disconnection; the load of establishing the LSP tunnel is small, which will not influence the normal services of the network. Just about these advantages, they make the MPLS TE become a very attractive traffic engineering scheme. Through the MPLS TE technology, the service provider is able to fully utilize the existing network resource to provide the diversified services, and meanwhile, can optimize the network resources and perform scientific network management.

The FRR (MPLS TE Fast Reroute) technology is one technology of realizing the local protection of the network. In a network applying the MPLS TE, when the link or node becomes invalid somewhere, the LSP configured with the fast reroute protection can switch the data to a protection link automatically. The MPLS TE FRR, by establishing a local backup path in advance, protects the LSP from being influenced by the link/node fault. When the fault occurs, the device that detects the link/node fault can switch the services from the faulted link to the backup path rapidly, thereby reducing data loss.

Fast response and timely switch are characteristics of the MPLS TE FRR, which can control the interrupted time of services in a very small time period and guarantees the smooth transition of service data; and meanwhile, the header node of the LSP will try to find a new path to reestablish the LSP, and switch the data to the new path. Before the new LSP is established successfully, the service data will be forwarded through the protection path all the time.

The typical networking of VPLS includes devices of a custom edge network device (Custom Edge, CE), a provider edge network device (Provider Edge, PE), a backbone network core router (Provider Router, P), etc. An interface device in the VPLS network supports broadcasting, forwarding and filtering Ethernet packets. The PEs interconnect with each other through Pseudo Wires (PW), which forms a simulation LAN to the customer. Each PE needs to not only learn the MAC (Media Access Control) address of the Ethernet message from the PW, but also learn the MAC address from the CE connected with itself. The PW usually uses the MPLS tunnel to finish the data transparent transmission between the PEs, and the tunnel can be an LDP (Label Distribution Protocol), an RSVP-TE (Resource ReSerVation Protocol-Traffic Engineering), etc. The PE is usually an MPLS edge router, and can establish tunnels to other PEs.

However, the reliability of the link between the PEs still needs to be improved. In particular, reducing the loss of the VPLS network flow after the link or node is invalid, it needs to protect the link between the PEs, i.e., the tunnel to construct the PW.

Content of the Invention

The technical problem that the present invention requires to solve is to provide a method and device for a link protection in a virtual private local area network, which solves the problem of rapidly switching and recovering of the flow when the VPLS flow is interrupted.

In order to solve the above-mentioned problem, the present invention provides a method for a link protection in a virtual private local area network, comprising:

in a networking process of a virtual private local area network services (VPLS) network, a link protection device establishing a main tunnel and a standby tunnel of multi-protocol label switching (MPLS) traffic engineering (TE) for a link, and creating a VPLS forwarding table to organize information of the established MPLS TE main tunnel and standby tunnel; and when receiving a VPLS message, the link protection device searching the information of the MPLS TE main tunnel of transmitting the VPLS message according to a way of accessing the VPLS network of the VPLS message and the VPLS forwarding table, and if the found MPLS TE main tunnel is invalid, then transmitting the received VPLS message by adopting the standby tunnel of the MPLS TE main tunnel.

In the above-mentioned method, the VPLS forwarding table comprises a VPLS broadcast forwarding table, a VPLS media access control (MAC) forwarding table, a TE fast reroute (FRR) table and a next hop output port table.

The above-mentioned method further comprises: the link protection device creating a VPLS access attribute table according to a networking structure of the VPLS network; wherein, the step of the link protection device creating the VPLS forwarding table to organize the information of the established MPLS TE main tunnel and standby tunnel comprises: the link protection device creating the VPLS forwarding table according to the networking structure of the VPLS network; organizing various VPLS accessing ways and a corresponding relation of the VPLS broadcast forwarding table and the VPLS MAC forwarding table in the VPLS forwarding table through the VPLS access attribute table, organizing the information of the established MPLS TE main tunnel and information whether the established MPLS TE main tunnel has a standby tunnel through the VPLS broadcast forwarding table and the VPLS MAC forwarding table, organizing a corresponding relation of the MPLS TE main tunnel and standby tunnel and the next hop output port table in the VPLS forwarding table through the TE FRR table in the VPLS forwarding table, and organizing an output port of the MPLS TE main tunnel and standby tunnel through the next hop output port table.

In the above-mentioned method, both the VPLS broadcast forwarding table and the VPLS MAC forwarding table of the VPLS forwarding table comprise a TE FRR flag bit; and the step of the link protection device organizing the information whether the established MPLS TE main tunnel has a standby tunnel through the VPLS broadcast forwarding table and the VPLS MAC forwarding table comprises: the link protection device organizing whether the established MPLS TE main tunnel has a standby tunnel through the TE FRR flag bit; when the TE FRR flag bit is valid, indicating that the established MPLS TE main tunnel has a standby tunnel, and when the TE FRR flag bit is invalid, indicating that the established MPLS TE main tunnel does not have a standby tunnel.

In the above-mentioned method, the step of the link protection device searching the information of the MPLS TE main tunnel of transmitting the VPLS message according to a way of accessing the VPLS network of the VPLS message and the VPLS forwarding table comprises: the link protection device searching the information of the MPLS TE main tunnel of transmitting the VPLS network message organized in the VPLS broadcast forwarding table or the VPLS MAC forwarding table by the VPLS access attribute table according to the way of accessing the VPLS network of the VPLS network message;

if the found MPLS TE main tunnel is invalid, then the step of transmitting the received VPLS message by adopting the standby tunnel of the MPLS TE main tunnel comprises: the link protection device judging that the MPLS TE main tunnel has a standby tunnel through the VPLS broadcast forwarding table or the VPLS MAC forwarding table, searching the output port of the standby tunnel of the MPLS TE main tunnel in the next hop output port table through the organization of the TE FRR table, and transmitting the VPLS network message by adopting the standby tunnel.

The present invention further provides a device for a link protection in a virtual private local area network, comprising a platform protocol processing module, a table entry writing processing module and a data forwarding processing module, wherein:

the platform protocol processing module is configured to, in a networking process of a virtual private local area network services (VPLS) network, establish a main tunnel and a standby tunnel of multi-protocol label switching (MPLS) traffic engineering (TE) for a link;

the table entry writing processing module is configured to create a VPLS forwarding table to organize information of the MPLS TE main tunnel and standby tunnel established by the platform protocol processing module; and the data forwarding processing module is configured to, when receiving a VPLS network message, search the information of the MPLS TE main tunnel of transmitting the VPLS network message according to a way of accessing the VPLS network of the VPLS network message and the created VPLS forwarding table, and if the found MPLS TE main tunnel is invalid, then transmit the received VPLS network message by adopting the standby tunnel of the MPLS TE main tunnel.

In the above-mentioned device, the VPLS forwarding table created by the table entry writing processing module comprises a VPLS broadcast forwarding table, a VPLS media access control (MAC) forwarding table, a TE fast reroute (FRR) table and a next hop output port table.

In the above-mentioned device, the table entry writing processing module is further configured to create a VPLS access attribute table;

wherein, the VPLS access attribute table is configured to organize various VPLS accessing ways and a corresponding relation of the VPLS broadcast forwarding table and the VPLS MAC forwarding table in the VPLS forwarding table;

both the VPLS broadcast forwarding table and the VPLS MAC forwarding table are configured to organize the information of the established MPLS TE main tunnel and information whether the MPLS TE main tunnel has a standby tunnel;

the TE FRR table in the VPLS forwarding table is configured to organize a corresponding relation of the MPLS TE main tunnel and standby tunnel and the next hop output port table in the VPLS forwarding table; and the next hop output port table is configured to organize an output port of the MPLS TE main tunnel and standby tunnel.

In the above-mentioned device, both the VPLS broadcast forwarding table and the VPLS MAC forwarding table comprise a TE FRR flag bit; and the link protection device organizes whether the established MPLS TE main tunnel has a standby tunnel by the TE FRR flag bit, when the TE FRR flag bit is valid, indicates that the established MPLS TE main tunnel has a standby tunnel, and when the TE FRR flag bit is invalid, indicates that the established MPLS TE main tunnel does not have a standby tunnel.

In the above-mentioned device, the data forwarding processing module is further configured to search the information of the MPLS TE main tunnel of transmitting the VPLS network message organized in the VPLS broadcast forwarding table or the VPLS MAC forwarding table by the VPLS access attribute table according to the way of accessing the VPLS network of the VPLS network message; and if the found MPLS TE main tunnel is invalid, and when judging that the MPLS TE main tunnel has a standby tunnel through the VPLS broadcast forwarding table, search the output port of the standby tunnel of the MPLS TE main tunnel in the next hop output port table through the organization of the TE FRR table, and transmit the VPLS network message by adopting the standby tunnel.

The technical scheme of the present invention can improve the local protection function of the network and reduce the loss of the service volume.

PREFERRED EMBODIMENTS OF THE PRESENT INVENTION

The main conception of the present invention is that, in a networking process of a VPLS network, an MPLS TE main tunnel and a standby tunnel can be established for each link, in this way, when the link has a fault (that is, when the main tunnel disconnects), a fast reroute technology (FRR) of RSVP-TE can be adopted to perform service data (i.e., received VPLS network message) forwarding by using the standby tunnel, in order to reach purposes of switching rapidly and reducing loss of the traffic flow.

The technical scheme of the present invention is further described in detail in combination with the accompanying drawings and embodiments hereinafter.

A device for a link protection in a virtual private local area network can be built in a network element, such as, a switchboard or a router, etc. The device at least includes a platform protocol processing module, a table entry writing processing module and a data forwarding processing module. The function of each module is described hereinafter.

The platform protocol processing module is configured to establish a MPLS TE main tunnel and a standby tunnel, establish a VPLS link, start up a protection relation of the FRR, and bind the VPLS onto the TE main tunnel;

the table entry writing processing module is configured to create a VPLS forwarding table, and the VPLS forwarding table mainly includes a VPLS MAC forwarding table, a VPLS broadcast forwarding table, a TE FRR table and a next hop output port table, wherein, the VPLS MAC forwarding table and the VPLS broadcast forwarding table are written with a TE FRR look-up index, and the TE FRR table includes a TE output label, a TE inner label, output port information of the main tunnel and the standby tunnel;

the table entry writing processing module is further configured to create a VPLS access attribute table; the VPLS access attribute table is configured to organize various VPLS accessing ways and a corresponding relation of the VPLS broadcast forwarding table and the VPLS MAC forwarding table in the VPLS forwarding table;

the data forwarding processing module is configured to, according to a result of looking up the table entry, encapsulate the VPLS network message; a virtual circuit (VC) label is obtained from the VPLS forwarding table, the TE output label is obtained from the TE FRR table, and meanwhile, the output port information of the main tunnel and the standby tunnel is read from the TE FRR table; when the main tunnel is abnormal, the virtual LAN service serving data forwarding flow will be processed through the standby tunnel, thus completing the protection of the VPLS traffic flow.

Figure 1:
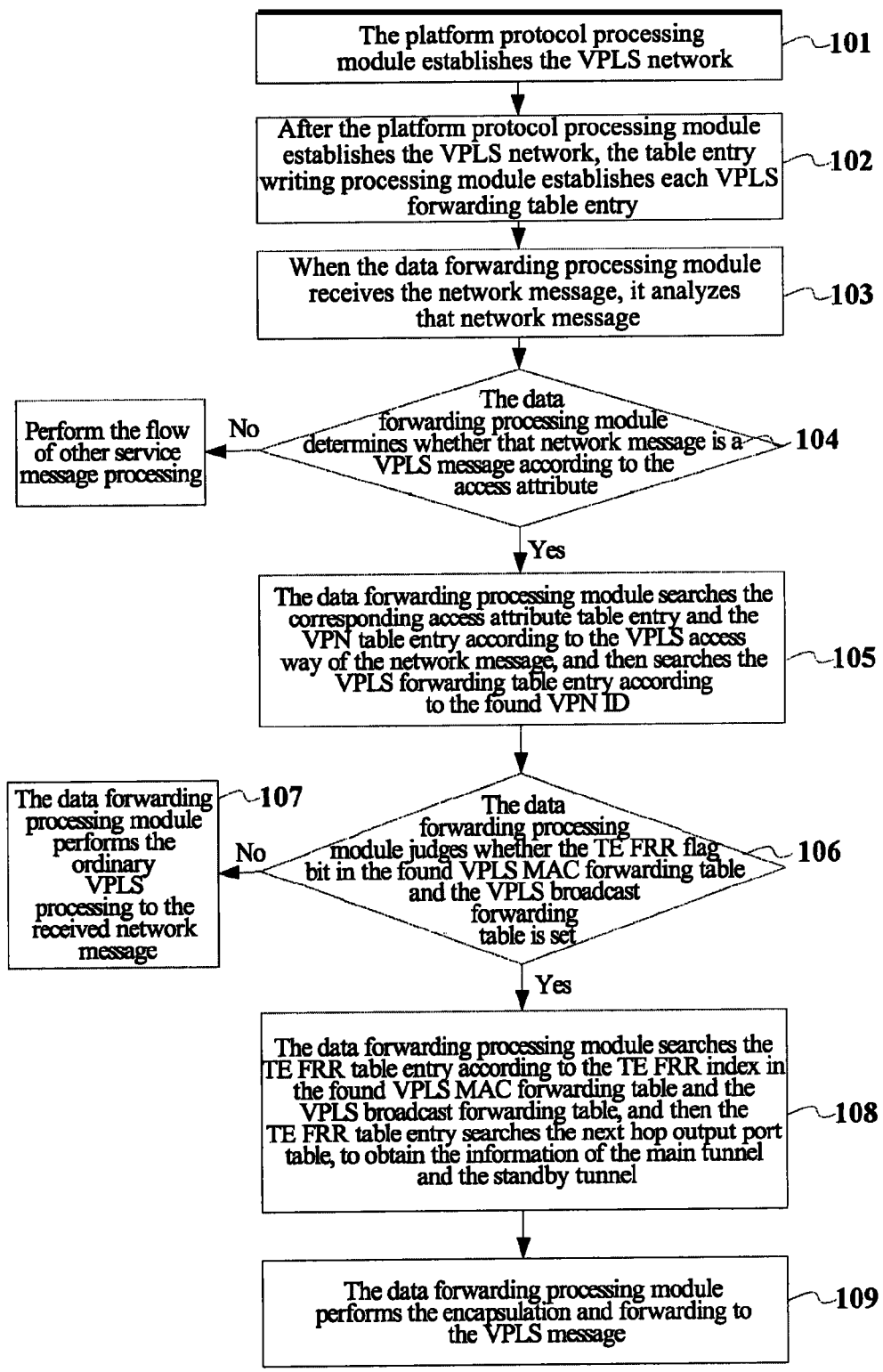
FIG. 1 is a flow chart of a data forwarding process of the present invention.

The processing procedure of the above-mentioned apparatus realizing the local link protection of the virtual private local area network services will be introduced in detail hereinafter, and that procedure is shown in FIG. 1 and includes the following steps.

In step 101, the platform protocol processing module establishes the VPLS network.

In that step, the platform protocol processing module needs to establish the MPLS TE tunnels and deploy the VPLS (that is, selecting a way of accessing the VPLS network and building the VPLS network) for each link at first; wherein, the established MPLS TE tunnels includes a main tunnel and a standby tunnel, the standby tunnel is mainly used to protect the flow of the main tunnel when the main tunnel is abnormal; there are various ways of accessing the VPLS network, such as, PORT accessing, VLAN accessing, QINQ accessing, etc.

Figure 2:
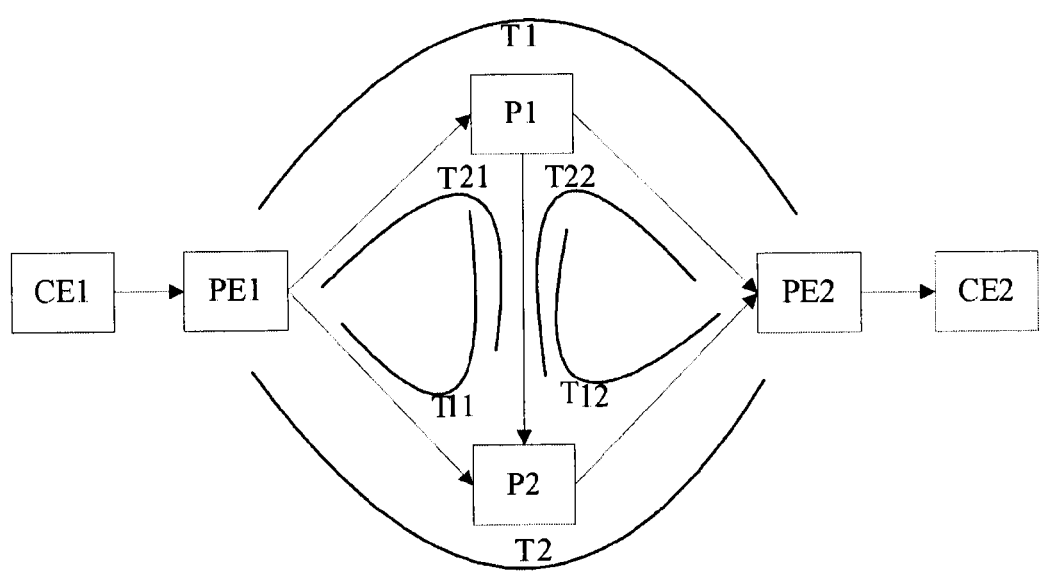
FIG. 2 is a structure diagram of networking of a fast reroute technology protecting a VPLS link of the present invention.

For example, a VPLS network architecture established by the platform protocol processing module is shown in FIG. 2; wherein, tunnels T2 (PE1-P2-PE2) and T21 (PE1-P1-P2) are established for a PE1 device, tunnels T1 (PE2-P1-PE1) and T12 (PE2-P2-P1) are established for a PE2 device, a tunnel T11 (P1-P2-PE1) is established for a P1 device, and a tunnel T22 (P2-P1-PE2) is established for a P2 device; wherein, the tunnels T1 and T2 are the main tunnel in the VPLS network, and the tunnel T11 is a standby tunnel used for protecting the link between the devices P1-PE1 of the T1 tunnel, the tunnel T12 is a standby tunnel used for protecting the link between the devices PE2-P1 of the T1 tunnel, the tunnel T21 is a standby tunnel used for protecting the link between the devices PE1-P2 of the T2 tunnel, and the tunnel T22 is a standby tunnel used for protecting the link between the devices P2-PE2 of the T2 tunnel.

In step 102, after the platform protocol processing module establishes the VPLS network, the table entry writing processing module establishes each VPLS forwarding table entry, wherein, the VPLS forwarding table entry required by forwarding is established according to the topological structure of the established VPLS network, and it indicates that which main tunnel has a standby tunnel (that is, which main tunnel is configured with the TE FRR protect function of the VPLS) in the result of the VPLS forwarding table entry. In the present embodiment, it can set a TE FRR flag bit in the VPLS MAC forwarding table and the VPLS broadcast forwarding table of the main tunnel of which the standby tunnel is established, to indicate that the standby tunnel of that main tunnel exists in the VPLS network.

In that step, the table entry writing processing module is mainly to write the table entry according to a networking topological structure of the platform protocol processing module, wherein, the table entry required to be written includes: a VPLS access attribute table entry, a VPN table entry and a VPLS forwarding, and the VPLS forwarding table entry further includes a structure of a VPLS broadcast forwarding table entry, a VPLS MAC forwarding table entry, a TE FRR table entry and a next hop output port table entry etc.; and all these table entries include two parts of contents, KEY and Result, and the link protection of the VPLS is realized by the judgment result of the Result in each table entry, and the encapsulation of the VPLS network message is completed through the Results of these table entries; and each parameter in each table entry can be determined by the user according to the designing requirement.

For example, in the networking as shown in FIG. 2, taking the PE1 device for example, the access attribute table entry and various VPLS forwarding tables are established, wherein, the VPLS MAC forwarding table is shown in table 1, the VPLS broadcast forwarding table is shown in table 2, the TE FRR table entry is shown in table 3, the next hop output port table entry is shown in table 4, and the access attribute table entry is shown in table 5.

TABLE 1

| VPLS MAC forwarding table | | | | |
|---|---|---|---|---|
| KEY MAC address and VPNID | | Result | | |
| MAC from the CE2 | FRR index | FRR flag | VC label | Output label |
| ... | ... | ... | ... | ... |

TABLE 2

| VPLS broadcast forwarding table | | | | |
|---|---|---|---|---|
| KEY VPNID | | Result | | |
| VPNID | FRR index | FRR flag | VC label | Output label |
| ... | ... | ... | ... | ... |

TABLE 3

TE FRR table entry

| KEY FRR index | | | Result | |
| --- | --- | --- | --- | --- |
| FRR protection serial number | Main tunnel index | Standby tunnel index | TE output label (allocated for PE1 by P1) | TE inner label (allocated for PE1 by P2) |
| ... | ... | ... | ... | ... |

TABLE 4

Next hop output port table entry

| KEY Index serial number | Result |
| --- | --- |
| Main tunnel index serial number | Output port from the PE1 device to the P2 device |
| Standby tunnel index serial number | Output port from the PE1 device to the P1 device |
| ... | ... |

TABLE 5

Access attribute table entry

| KEY Access attribute | Result |
| --- | --- |
| VLAN | VPN ID |
| PORT | VPN ID |
| ... | ... |

In step 103, when the data forwarding processing module receives the network message, it analyzes that network message;

in that step, in the process of analyzing the network message, it can distinguish whether that network message is layer 2 processing or layer 3 processing according to the MAC address, and the VPLS belongs to layer 2 service.

In step 104, the data forwarding processing module determines whether that network message is a VPLS message according to the access attribute; if yes, step 105 is performed, otherwise, other processing flow of the service message is performed.

In that step, the data forwarding processing module judges whether the received network message is a VPLS network message (i.e., including the VPLS data) according to the accessing way of the network message.

For example, in the networking shown in FIG. 2, taking the PE1 device for example, its accessing ways have the PORT accessing, the VLAN accessing, the PORT+VLAN accessing, the QINQ accessing, etc.; and, taking the VLAN accessing way for example, the VPLS from the PE1 device to the PE2 device is the VLAN accessing, in this way, the user message belonging to that VLAN from the CE1 device is the VPLS network message, which needs to be performed the VPLS processing.

In step 105, the data forwarding processing module searches the corresponding access attribute table entry and the VPN table entry according to the VPLS accessing way of the network message, and then searches the VPLS forwarding table entry according to the found VPN ID.

In that step, the data forwarding module searches the access attribute table entry and the VPN table entry according to the VPLS access attribute of the network message, and then builds to search the key value of the VPLS broadcast forwarding table or the VPLS MAC forwarding table entry according to the VPN ID in the VPN table entry; since there is no VPLS MAC forwarding table entry when the VPLS is established at the beginning, it requires to search a VPLS broadcast table to determine the forwarding processing flow of the message, and after learning the MAC address, it searches the VPLS MAC table to determine the forwarding processing flow of the message.

For example, in the networking shown in FIG. 2, take the PE1 device for example, when the CE1 device and the CE2 device communicate through the VPLS, and when the PE1 device has not learned the MAC address yet, it performs the forwarding according to the VPLS broadcast forwarding table, wherein, the VPLS broadcast forwarding table is shown in table 2, and the network message is broadcast to the whole VPLS network; after learning the MAC address of the message from the CE2 device, it performs the unicast forwarding according to the VPLS MAC forwarding table, and the VPLS MAC forwarding table is shown in table 1.

In step 106, the data forwarding processing module judges whether the TE FRR flag bit in the found VPLS MAC forwarding table and the VPLS broadcast forwarding table is set; if yes, step 108 is performed, otherwise, step 107 is performed.

In the networking shown in FIG. 2, the VPLS from the PE1 to the PE2 passes through the tunnel T2, the VPLS from the PE2 to the PE1 passes through the tunnel T1, 2 sections of link ports of the tunnel T1 are protected by using the tunnels T11 and T12, and both ends of links of the T2 are protected by using the tunnels T21 and T22; and the FRR bits of the forwarding table entries in the devices PE1 and PE2 will be set to identify whether the TE FRR protect function of the VPLS is configured.

In step 107, the data forwarding processing module performs the ordinary VPLS processing to the received network message, and this flow ends;

in that step, the data forwarding processing module can process the received network message according to the existing way of the ordinary VPLS processing.

For example, in the networking shown in FIG. 2, taking the PE1 device for example, the PE1 device can configure the VPLS protected by the TE FRR, and can also configure the ordinary VPLS, and the processing of the two services is independent.

In step 108, the data forwarding processing module searches the TE FRR table entry according to the TE FRR index in the found VPLS MAC forwarding table and the VPLS broadcast forwarding table, and then searches the next hop output port table by the TE FRR table entry, to obtain the information of the main tunnel and the standby tunnel (such as, the output port of the main tunnel and the output port of the standby tunnel).

In that step, after the data forwarding processing module searches the TE FRR table according to the TE FRR index, information of a main tunnel index and a standby tunnel index is in the TE FRR table, and then it searches the next hop output port table according to the main tunnel index and the standby tunnel index to obtain the output port of the main tunnel or the output port of the standby tunnel.

Specifically, when the main tunnel is normal, it only needs the output port of the main tunnel, when the main tunnel is abnormal, the standby tunnel index is written to the location of the main tunnel, thus searching the next hop output port table to obtain the output port of the standby tunnel.

For example, in the networking shown in FIG. 2, taking the PE1 device for example, the TE FRR table entry is shown in table 3, and the TE FRR table entry includes the main tunnel index and the standby tunnel index. The PE1 device can obtain the output ports of the main tunnel and the standby tunnel by searching the next hop output port table according to the main tunnel index and the standby tunnel index. The next hop output port table is shown in table 4; the output port of the main tunnel is the output port PE1-P2 link of the tunnel T2, the output port of the standby tunnel is the output port PE1-P1-P2 link of the tunnel T21.

In step 109: the data forwarding processing module performs the encapsulation and forwarding to the VPLS message.

In that step, after the data forwarding processing module completes searching the VPLS forwarding table and the TE FRR table, it encapsulates the message according to the result of searching the table entry; the VC label of the VPLS is obtained from the forwarding table, the VC label is the label allocated through the LDP protocol, the forwarding label of the VPLS is the label obtained from the TE FRR table entry, and the label of the TE FRR table entry is the label allocated through the RSVP protocol.

For example, in the networking shown in FIG. 2, taking the PE1 device for example, the VC label is allocated through the LDP protocol. When the MAC address of the CE2 is learned, the internal layer VC label is obtained from the MAC table, and the VPLS MAC table is shown in table 1; when the MAC address of the CE2 is not learned, the VC label is obtained in the broadcast table, and the broadcast table is shown in table 2. The forwarding label is allocated through the RSVP protocol, and obtained from the TE FRR table; as to the networking shown in FIG. 2, the message will encapsulate the TE output label and the TE inner label, the TE output label is the label allocated to the PE1 by the P1, and the TE inner label is the label allocated to the PE1 by the P2. When the tunnel T2 is normal, only the TE inner label is valid, and the message encapsulates layer 2 MPLS label and passes through the tunnel T2 for forwarding; and when the tunnel T2 is abnormal, the message on the device PE1 encapsulates layer 3 MPLS label, and the VPLS traffic flow passes through the standby tunnel T21 for forwarding.

It can be seen from the above-mentioned embodiment, compared with the related art, the technical scheme of the present invention introduces the RSVP-TE fast reroute tunnel, binds the main tunnel and the standby tunnel onto the VPLS, in this way, the VPLS goes onto the tunnel of the TE; and meanwhile, since the tunnel path can be set on its own as needed, it will not be influenced by the label allocation path established by the LDP protocol, in this way, it plays a very good protective action on the network of the VPLS. In addition, the present invention also realizes the flow control function of the VPLS by using the flow control of the RSVP-TE tunnel, which meets the requirement of the VPLS better.

The above description is only one kind of embodiment of the present invention, and it is not intended to limit the protective scope of the present invention. Those skilled in the art can think of the variations and replacements easily within the technical scope disclosed by the present invention, and all of the variations and replacements should be embodied in the protective scope of the present invention. Therefore, the protective scope of the present invention should be subject to the protective scope of the claims.

INDUSTRIAL APPLICABILITY

The technical scheme of the present invention introduces the RSVP-TE fast reroute tunnel, binds the main tunnel and the standby tunnel onto the VPLS, so that the VPLS goes onto the tunnel of the TE; and meanwhile, since the tunnel path can be set on its own as needed, it will not be influenced by the label allocation path established by the LDP protocol, so that it plays a very good protection on the network of the VPLS. In addition, the present invention also realizes the flow control function of the VPLS by using the flow control of the RSVP-TE tunnel, which meets the requirement of the VPLS better.

What we claim is:

1. A method for a link protection in a virtual private local area network, comprising:
   in a networking process of a virtual private local area network services (VPLS) network, a link protection device establishing a main tunnel and a standby tunnel of multi-protocol label switching (MPLS) traffic engineering (TE) for a link, and creating a VPLS forwarding table to organize information of the established MPLS TE main tunnel and standby tunnel; and
   when receiving a VPLS message, the link protection device searching the information of the MPLS TE main tunnel of transmitting the VPLS message according to a way of accessing the VPLS network of the VPLS message and the VPLS forwarding table, and if the found MPLS TE man tunnel is invalid, then transmitting the received VPLS message by adopting the standby tunnel of the MPLS TE main tunnel;
   wherein,
   the VPLS forwarding table comprises a VPLS broadcast forwarding table, a VPLS media access control (MAC) forwarding table, a TE fast reroute (FRR) table and a next hop output port table.

2. The method according to claim 1 further comprising:
   the link protection device creating a VPLS access attribute table according to a networking structure of the VPLS network;
   wherein, the step of the link protection device creating the VPLS forwarding table to organize the information of the established MPLS TE main tunnel and standby tunnel comprises:
   the link protection device creating the VPLS forwarding table according to the networking structure of the VPLS network; organizing various VPLS accessing ways and a corresponding relation of the VPLS broadcast forwarding table and the VPLS MAC forwarding table in the VPLS forwarding table through the VPLS access attribute table, organizing the information of the established MPLS TE main tunnel and information whether the established MPLS TE main tunnel has a standby tunnel through the VPLS broadcast forwarding table and the VPLS MAC forwarding table, organizing a corresponding relation of the MPLS TE main tunnel and standby tunnel and the next hop output port table in the VPLS forwarding table through the TE FRR table in the VPLS forwarding table, and organizing an output port of the MPLS TE main tunnel and standby tunnel through the next hop output port table.

3. The method according to claim 2, wherein,
   both the VPLS broadcast forwarding table and the VPLS MAC forwarding table of the VPLS forwarding table comprise a TE FRR flag bit; and
   the step of the link protection device organizing the information whether the established MPLS TE main tunnel has a standby tunnel through the VPLS broadcast forwarding table and the VPLS MAC forwarding table comprises, the link protection device organizing whether the established MPLS TE main tunnel has a standby tunnel through the TE FRR flag bit; when the TE FRR flag bit is valid, indicating that the established MPLS TE main tunnel has a standby tunnel, and when the TE FRR flag bit is invalid, indicating that the established MPLS TE main tunnel does not have a standby tunnel.

4. The method according to claim 3, wherein, the step of the link protection device searching the information of the MPLS TE main tunnel of transmitting the VPLS message according to a way of accessing the VPLS network of the VPLS message and the VPLS forwarding table comprises:

the link protection device searching the information of the MPLS TE main tunnel of transmitting the VPLS network message organized in the VPLS broadcast forwarding table or the VPLS MAC forwarding table by the VPLS access attribute table according to the way of accessing the VPLS network of the VPLS network message;

if the found MPLS TE main tunnel is invalid, then the step of transmitting the received VPLS message by adopting the standby tunnel of the MPLS TE main tunnel comprises:

the link protection device judging whether the MPLS TE main tunnel has a standby tunnel through the VPLS broadcast forwarding table or the VPLS MAC forwarding table, and when judging that the MPLS TE main tunnel has a standby tunnel, the link protection device searching the output port of the standby tunnel of the MPLS TE main tunnel in the next hop output port table through the TE FRR table, and transmitting the VPLS network message by adopting the standby tunnel.

* * * * *